(12) United States Patent
Callahan et al.

(10) Patent No.: US 7,109,997 B1
(45) Date of Patent: Sep. 19, 2006

(54) SYSTEMS AND METHODS FOR DIRECT STORAGE OF COMPRESSED SCAN CONVERTED DATA

(75) Inventors: Sean Callahan, St Paul, MN (US); Peter T. Barrett, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 194 days.

(21) Appl. No.: 10/187,265

(22) Filed: Jun. 28, 2002

(51) Int. Cl.
*G06T 9/00* (2006.01)
*G09G 5/00* (2006.01)
*G06K 9/40* (2006.01)
*G09G 5/36* (2006.01)
*G06K 9/66* (2006.01)
*G06F 15/167* (2006.01)

(52) U.S. Cl. ............... 345/555; 345/611; 345/537; 345/545; 382/232; 382/269

(58) Field of Classification Search ........ 345/555–557, 345/619, 611–614, 629, 668, 421, 428, 581, 345/468, 536–538, 541, 545, 582; 382/232, 382/245, 193–194, 254, 199, 266, 269, 274–275
See application file for complete search history.

(56) References Cited

U.S. PATENT DOCUMENTS

| 5,295,235 | A | * | 3/1994 | Newman ................... 345/619 |
| 5,363,119 | A | * | 11/1994 | Snyder et al. ............. 345/668 |
| 5,696,946 | A | | 12/1997 | Patrick et al. |
| 5,867,166 | A | | 2/1999 | Myhrvold et al. |
| 5,940,080 | A | * | 8/1999 | Ruehle et al. ............. 345/611 |
| 5,995,116 | A | * | 11/1999 | Fujimura ................... 345/441 |
| 5,999,189 | A | | 12/1999 | Kajiya et al. |
| 6,239,812 | B1 | | 5/2001 | Pettazzi et al. |
| 6,292,194 | B1 | | 9/2001 | Powell, III |
| 6,359,623 | B1 | | 3/2002 | Larson |
| 6,567,091 | B1 | * | 5/2003 | Dye et al. .................. 345/501 |
| 6,781,600 | B1 | * | 8/2004 | Anwar ...................... 345/629 |
| 2001/0000979 | A1 | * | 5/2001 | Han et al. .................. 358/474 |

* cited by examiner

*Primary Examiner*—Wesner Sajous
(74) *Attorney, Agent, or Firm*—Lee & Hayes, PLLC

(57) ABSTRACT

The described implementations provide arrangements and procedures for scan converting data into compressed representations of pixel data. In particular, shape geometry including shape and/or position attributes of one or more objects are directly scan converted into compressed scan converted data. The compressed scan converted data is stored into memory for subsequent application access and rendering.

20 Claims, 4 Drawing Sheets

SYSTEMS AND METHODS FOR DIRECT STORAGE OF COMPRESSED SCAN CONVERTED DATA

TECHNICAL FIELD

The invention relates to managing bitmapped objects in a computer graphics system.

BACKGROUND

Two-dimensional graphics processing ("2-D graphics") refers generally to the creation of an image from graphical models having two dimensions (x and y coordinates). A graphical model defines attributes of real or imaginary objects that are to be represented in a rendered image. Such attributes include, for example, shape and position of an object in a graphics scene.

Traditional systems and techniques scan convert graphics data, scanline-by-scanline into arrays of pixel data. Pixel data is typically represented as one or more bitmaps. Scan conversion is a process that determines exact pixel locations on a screen of the display device that correspond to the graphics data. Scan conversion is normally performed by an edge stepper engine. The edge stepper steps down along the edges of a primitive until a point on the edge of the primitive is reached at which the primitive intersects a scan line, and then steps across the span corresponding to the scan line to determine the point on the opposite side of the primitive at which the scan line intersects the primitive.

One disadvantage of the conventional approach to performing scan conversion is that it generates uncompressed bitmaps that are stored in graphic device memory for subsequent use as program data by any number of different applications whenever similar graphics data is to be rendered. In a low-resource computing environment, meaning a client computing device has limited memory and/or processing resources, the amount of memory reserved for program data is limited. Storing uncompressed bitmaps into memory (e.g., non-volatile secondary storage) prior to their use may require a potentially prohibitive amount of storage space in the low resource environment. For instance, a 1280×1024 pixel true color image with 8-bits of color data per pixel requires approximately 4 megabytes of memory for storage.

Another disadvantage of conventional approaches to performing scan conversion is that the typical approach does not take into consideration that processing intensive image operations often need to be performed on graphics data prior to its display. Such operations are performed in order and include, for example: (a) after the uncompressed pixel data has already been stored into secondary storage as scan converted memory, compressing uncompressed pixel data to free-up memory resources; (b) decompressing bitmaps prior to moving them into a frame buffer (e.g., video random access memory (RAM)); and, (c) determining whether certain ones of the pixels in the bitmap should be blended/anti-aliased, sub-sampled, and/or resized to insure accurate or desired reproduction of the bitmap onto a particular physical display device. Each of these operations is processing intensive, and relatively slow.

Making this situation more difficult is that graphics data are typically used over and over by same or different applications (e.g., to display similar images, repaint previously occluded areas, to present a different zoom level, and so on), causing such described processing and memory intensive operations to be performed over and over again. Repetitive performances of such operations rapidly deplete processing and/or memory resources in the low resource environment.

The following discussion addresses these and other limitations of conventional systems and techniques for low-resource environments to manage bitmapped graphic objects.

SUMMARY

The described implementations provide arrangements and procedures for scan converting data into compressed representations of pixel data. In particular, shape geometry including shape and/or position attributes of one or more objects are directly scan converted into compressed scan converted data. The compressed scan converted data is stored into memory for subsequent application access and rendering.

BRIEF DESCRIPTION OF THE DRAWINGS

The same numbers are used throughout the drawings to reference like features and components.

FIG. 2 is used to show that spans of shape geometry are directly compressed rather than being stored in an uncompressed data format.

DETAILED DESCRIPTION

The following described systems and arrangements provide for scan converting graphics data, scanline-by-scanline, directly into compressed data prior to storage on a computing device. For purposes of this discussion, graphics data is referred to as shape geometry. This is because graphics data represents one or more lines and/or curves, which in turn may represent any character, rectangle, or any other simple or complex geometrical shape. Any number of different compression techniques such as run-length encoding (RLE) techniques can be used to compress scan converted data. Thus, rather than writing uncompressed pixel data or bitmaps into secondary storage, as do traditional scan conversion operations, shape geometry is directly compressed by the scan converter and stored in memory. The compressed scan converted data is available for referencing by applications whenever a similar image needs to be rendered onto a physical display device.

In one implementation, the scan converter tags certain pixels of an image as being candidates for anti-aliasing techniques. Such pixel tagging is performed during direct compressed scan conversion operations. The anti-aliasing information is directly encoded into the scan converted and compressed data. Thus, such pixel analysis for anti-aliasing operations need only be performed one time when the bitmap is generated, rather that each time that the bitmap is used by an application as do traditional image rendering operations. This system could be used, for example, as the basis of a font cache, where characters are scan converted and compressed once and then used repeatedly.

An Exemplary System

Figure 1:
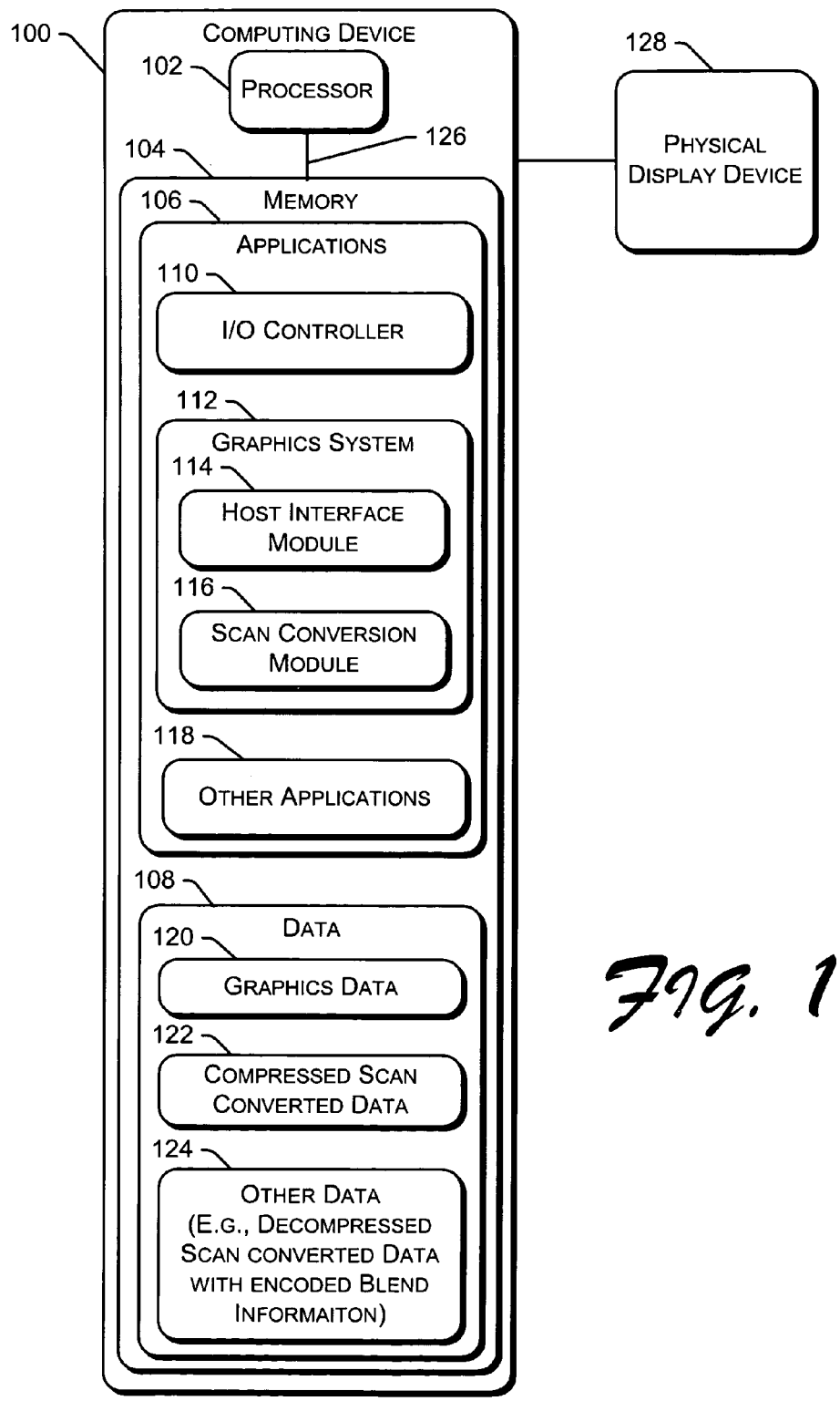
FIG. 1 shows an exemplary computing device for direct storage of compressed scan converted data.

FIG. 1 shows an exemplary computing device 100 for direct storage of compressed scan converted data. The computing device 100 is operational as any one of a number of different computing devices such as a full featured personal computer, an image server computer, a limited resource client, a thick client, a hand-held or laptop device, a multiprocessor system, a microprocessor-based system, a set top box, programmable consumer electronics, a wireless phone, an application specific integrated circuit (ASIC), a network PC, minicomputer, mainframe computer, and so on. For purposes of this discussion, a limited resource client is limited with respect to any combination of processing and/or memory resources as compared to a full featured computing system.

The computing device 100 includes host processor 102 coupled to system memory 104. The system memory 104 includes any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a floppy diskette, a flash memory card, a CD-ROM, and so on.

The processor 114 is configured to fetch and execute computer program instructions from program modules 106 or applications portion of memory 104, and further configured to fetch data from the data 108 portion of system memory 104 while executing program modules 106. Program modules 106 typically include routines, programs, objects, components, and so on, for performing particular tasks or implementing particular abstract data types.

In this implementation, program modules 106 include, for example, an input/output (I/O) controller 110, graphics system 112 including host interface module 114 and scan conversion module 116, and other applications 118 such as an operating system (OS) to provide a runtime environment, word processor, spreadsheet, an electronic program guide (EPG) application, etc. Data 108 includes, for example, shape geometry 120, compressed scan converted data 122, and other data 124 such as configuration data, etc.

Host processor 102 processes input received from a console (not shown) of the computing system 100 and outputs commands and data over the local bus 126 to the I/O controller 110. Local bus 126 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

I/O controller 110 formats the commands and data utilizing protocols of the I/O bus 126. Shape geometry 120 is received over I/O bus 126 is input to the graphics system 112. Shape geometry 120 defines attributes of real or imaginary objects (e.g., character fonts, etc.) that are to be represented in a rendered image. Such attributes include, for example, shape and position of an object in a graphics scene (Color is not included in shape geometry, since it is/are applied when decompressing compressed data into a frame buffer for rendering onto a physical display device). Graphics system 112 processes shape geometry 120 via host interface module 114 and scan conversion module 116. In particular, host interface module 114 fetches shape geometry 120 packets from the system memory 104 and then provides the fetched data 120 to the scan conversion module 116.

The scan conversion module 116, scanline-by-scanline, generates spans from the shape geometry 120. As discussed in greater detail below in reference to FIG. 2, such spans include any combination of "skip", "fill", and/or "blend" spans of specified pixel widths, and in the case of a blend span, indicate a percentage of foreground color data mix. Each type of span represents a run of respectively similar data. The scan conversion module 116 directly compresses and stores such span information into system memory 104 as compressed scan converted data 122. The directly generated and stored compressed scan converted data is available for subsequent access, decompression, and rendering onto physical display device 128 (coupled to computing device 100) by any number of applications 118.

In one implementation, scan conversion module 116 tags certain pixels generated from shape geometry 116 as being translucent, and thus candidates for anti-aliasing techniques. Such pixel tagging is performed during direct compressed scan conversion operations. The anti-aliasing information is directly encoded into the compressed scan converted data 122. Thus, such anti-aliasing operation pixel analysis need only be performed one time—when the bitmap is directly scan converted to compressed data. This is in substantial contrast to traditional image rendering operations, wherein such pixel evaluations are performed each time that an application desired to anti-alias image data.

Figure 2:
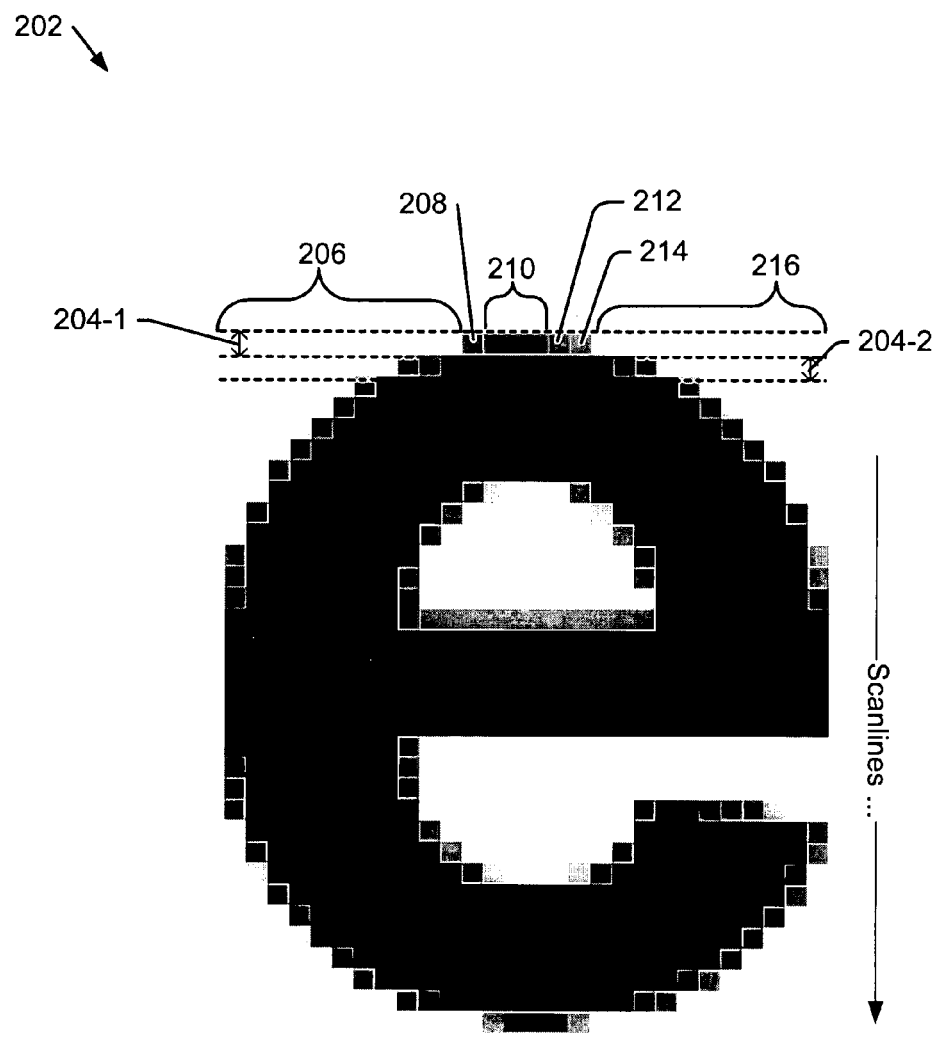
FIG. 2 shows aspects of direct scanline-by-scanline conversion of a character's shape geometry into a compressed data format. Specifically.

FIG. 2 shows aspects of exemplary scan conversion of shape geometry 120 representing a character 202 based on a font. The scan conversion module 116 includes an edge stepper engine (not shown) for stepping across the edges of the shape geometry 120, scanline-by-scanline, until a point on the edge of the character 202 is reached at which the character intersects the scanline 202. In this example, two (2) scanlines are shown, scanline 204-1 and scanline 204-2. Each scanline corresponds to a horizontal row of compressed data that is directly output from the scan conversion module 116 for storage into memory 104. Although the example of FIG. 2 shows only 2 scan lines, the scan conversion module 116, scanline-by-scanline, processes all shape geometry 120 corresponding to character 202 into compressed scan converted data 122.

For purposes of discussion, the edge stepper of the scan conversion module 116 processes the first/uppermost scanline 204-1 from left to right until the end of a scanline is reached, then the next lower scanline 204-2 is processed from right to left, and so on. Each scanline intersects with the character at various levels of gray that delimitate boundaries of the image, which in this example is a character. Scanline-by-scanline, scan conversion module 116 directly compresses shape geometry 120 into compressed scan converted data 122.

For example, scan conversion module 116 scan coverts shape geometry associated with the uppermost scanline 204-1 as follows. Scanline 204-1 is represented by areas 206 through 216. Each respective area corresponds to shape geometry for a particular number of pixels that have similar foreground and background attributes. For instance, areas 206 and 216 of scanline 204-1 corresponds to 100% background pixel data, whereas areas 208 through 214 include certain percentages of foreground pixel data. For purposes of discussion, areas 208, 210, 212, and 214 respectively have 25%, 40%, 30%, and 25% blend of foreground pixels with background pixels.

Accordingly, areas 206–216 are represented with the following instructions: "skip n", "blend n of m %", "blend n of m %", "blend n of m %", "blend n of m %", and "skip n", wherein n represents the pixel-width of a run of similar data in the area, and wherein m % represents a percentage (e.g., 25%, 40%, 30%, and 25%) of foreground pixel data to be added to the respective area's pixels during rendering operations. More particularly, the "skip n" instruction indicates that there is no foreground pixel data for a width of n pixels in the particular scanline being processed. The "blend n of m %" instruction indicates that the corresponding pixels are translucent and are candidates for anti-aliasing operations (i.e., mixing foreground and background pixel data to reduce appearance of jagged edges). In this example, if area 206 has a width of 20 pixels, area 208 a width of 1 pixel, area 210 a width of 3 pixels, area 212 a width of 1 pixel, area 214 a width of 1 pixel, and area 216 a width of 20 pixels, the shape geometry of scanline 204-1 is represented as: skip 20", blend 1 of 25%, blend 3 of 40%, blend 1 of 30%, blend 1 of 25%, and skip 20.

Areas that are to be represented with 100% foreground information (e.g., areas that are 100% black in the example of FIG. 2) are represented with a "fill n" instruction, wherein n represents the pixel-width of a run of similar data in the area. For example, scanline 204-2 can be represented with the following instructions: skip 17, blend 1 of 40%, blend 1 of 80%, fill 8, blend 1 of 80%, blend 1 of 40%, and skip 17.

In this manner, scanline-by-scanline, shape geometry 120 is directly transformed and stored into memory 104 by scan conversion component 116 as compressed scan converted data 122. Since shape geometry is directly scan converted into a compressed data format, scan converted data 122 of computing device 100 will require substantially less storage resources in a low resource computing environment as compared to conventional scan converted data. Application(s) 118 may repeatedly reference such compressed scan converted data 122 when similar image(s) need to be rendered.

To render compressed scan converted data 122, an application 118 references the compressed data 122 to write corresponding pixel data (uncompressed) into a frame buffer (e.g., a video frame buffer) of memory 104. Since blending information is directly compressed into the compressed scan converted data 122, the application 118 does not need to evaluate each pixel of scan converted data 122 to determine if pixels should be blended with foreground and background colors to smooth out the edges of rendered images. This allows applications to render considerably quality high image data from scan converted data 122, while at the same time substantially reducing use of processing and memory resources, as compared to traditional image processing techniques, in a low resource computing environment.

Although the example of FIG. 2 is described using a RLE compression algorithm to compress shape geometry 120, other lossless compression algorithms could be used as well.

Figure 3:
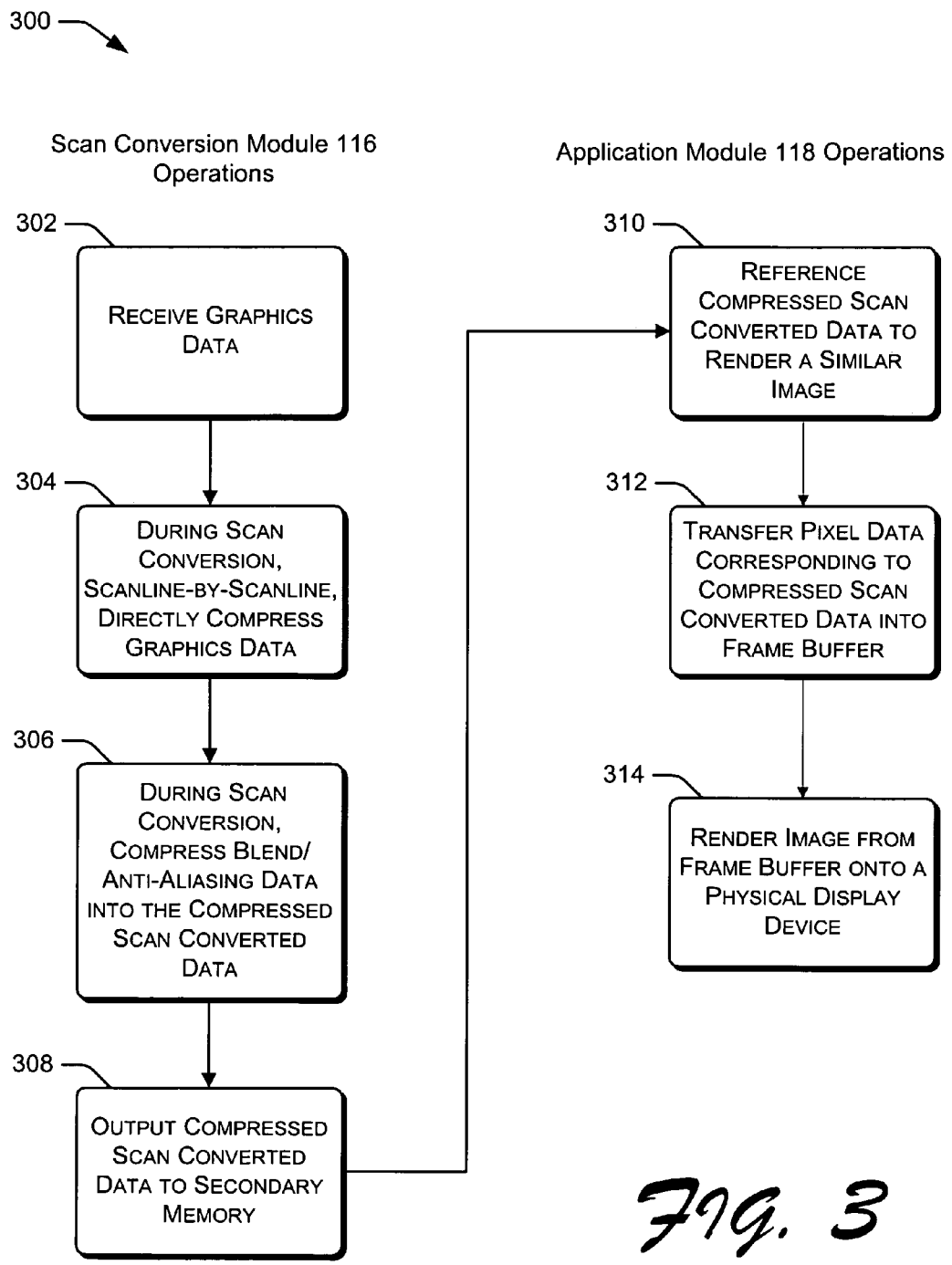
FIG. 3 is a block diagram of an exemplary procedure to directly generate and store compressed scan converted data in the computing system of FIG. 1.

FIG. 3 is a block diagram of an exemplary procedure 300 to directly generate and store compressed scan converted data in the computing system 100 of FIG. 1. For purposes of discussion, FIG. 3 is discussed with components of the computing system 100 of FIG. 1. Blocks 302–308 (the leftmost column) of FIG. 3 represent operations performed by the scan conversion module 116. Blocks 310–314 (the rightmost column) of FIG. 3 represent operations performed by one or more respective application(s) 118.

At block 302, the scan conversion module 116 receives shape geometry 120. Such shape geometry 120 can be stored in memory, generated dynamically by an application, created by user input and so on. At block 304, the scan conversion module 116 directly compresses the shape geometry 120, scanline-by-scanline. In one implementation, such compression is via a RLE compression algorithm. At block 306, during scan conversion operations, the scan conversion module 116 encodes anti-aliasing information into the compressed scan converted data 122. At block 308, the scan conversion module 116 stores compressed scan converted data 122 into secondary storage (e.g., non-volatile memory portions of memory 104).

At block 310, an application 118, responsive to needing to render an image similar to an image represented in compressed scan converted data 122, evaluates or references the compressed scan converted image 122. At block 312, application 312 transfers pixel data corresponding to the compressed scan converted data 122 into a frame buffer portion of memory 104. At block 314, the application renders the pixel data in the frame buffer to a display device 128.

Figure 4:
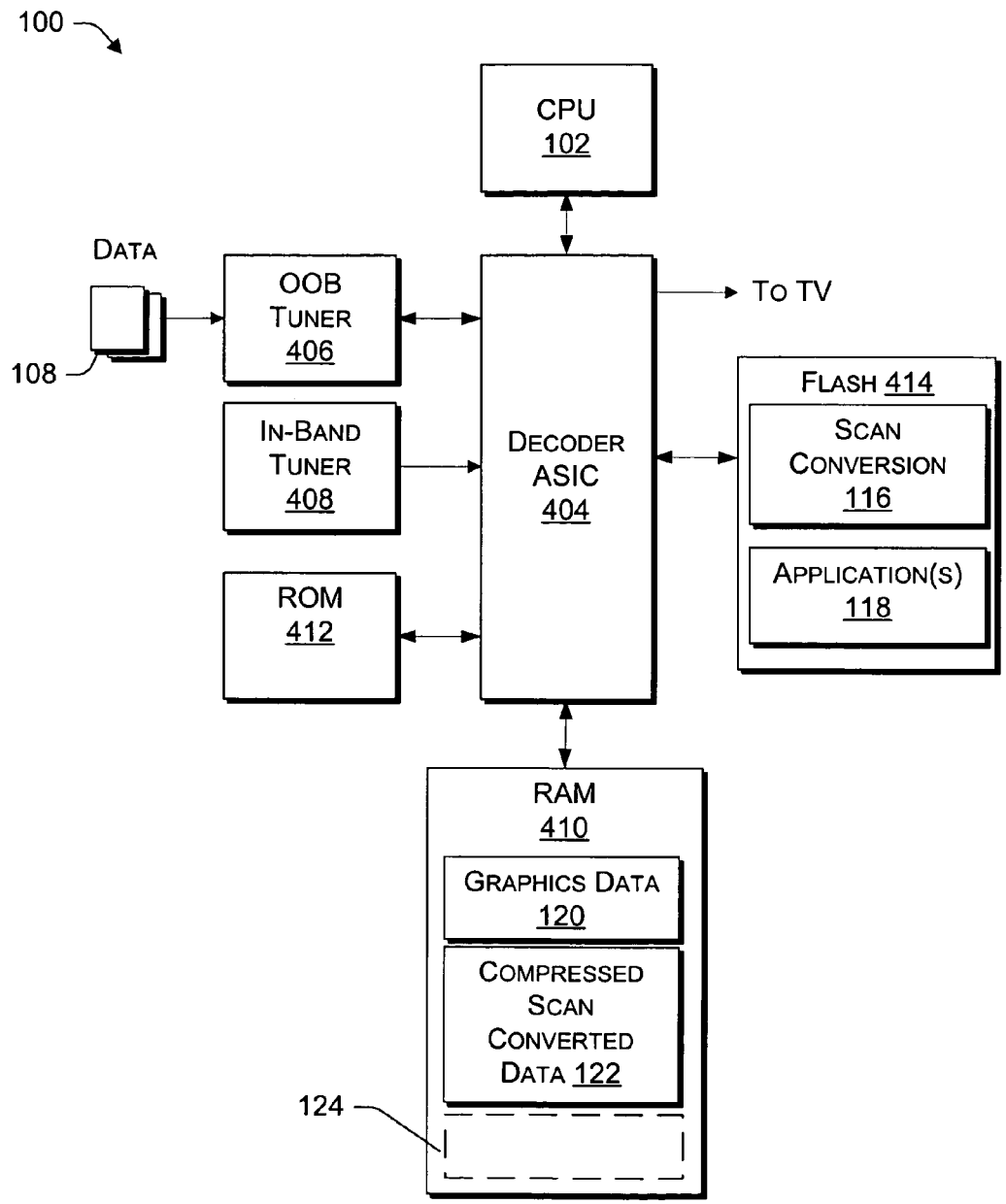
FIG. 4 shows an exemplary computing device of FIG. 1 implemented as a set-top box.

FIG. 4 shows an exemplary computing device 100 of FIG. 1 implemented as a set-top box. The computing device 100 has a central processing unit (CPU) 402 that is optionally coupled to a decoder ASIC (application specific integrated circuit) 404. In addition to decoder circuitry, ASIC 404 may also contain logic circuitry, bussing circuitry, and a video controller.

The computing device 100 further includes an out-of-band (OOB) tuner 406 to tune to the broadcast channel over which data 108 (e.g., shape geometry 120, EPG data (not shown), and/or other data) is downloaded as one or more electronic files. One or more in-band tuners 408 are also provided to tune to various television signals. These signals are passed through the ASIC 404 for audio and video decoding and then to an output to a television set or video recorder. With the tuners and ASIC 404, the client is equipped with hardware and/or software to receive and decode a broadcast video signal, such as an NTSC, PAL, SECAM or other TV system video signal and provide video data to the television set.

In this exemplary implementation, one or more memories such as memory 104 of FIG. 1 are coupled to ASIC 404 to store software and data used to operate the client. In the illustrated implementation, the client has random access memory (RAM) 410, read only memory (ROM) 412, and flash memory 414. RAM 410 stores data used by the client, including graphics data 120, compressed, scan-converted data 122, and any compression table (not shown) used to decompress compressed scan converted data 122. ROM 412 stores an operating system (not shown).

One or more programs may be stored in the ROM 412 or in the flash memory 414. In the illustrated example, the flash memory 414 stores scan conversion module 116 for directly generating compressed scan converted data 122 from shape geometry 120. Other application(s) 118 (e.g., Web browser, e-mail, an EPG, and/or other applications) are also stored in the flash memory 414 and can be executed to decompress compressed scan converted data 122 into one or more bitmaps 124 for presentation to a user.

The computing device 100 may further include other components, which are not shown for simplicity purposes. For instance, the client is typically equipped with hardware and/or software to present a graphical user interface to a viewer, by which the viewer can view images generated by application(s) 118 and access Internet system network services, browse the Web, or send email. Other possible components might include a network connection (e.g., modem, ISDN modem, etc.) to provide connection to a network, an IR interface, display, power resources, etc. A remote control may also be provided to allow the user to control the client.

Computer Readable Media

An implementation of exemplary subject matter to directly compress/decompress directly compressed scan converted data 122 may be stored on or transmitted across some form of computer-readable media. Computer-readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

The described arrangements and procedures provide for a high level customizable and scalable architecture to directly compress and utilize scan converted data. Although the arrangements and systems to directly compress and utilize scan converted data have been described in language specific to structural features and methodological operations, the arrangements and procedures as defined in the appended claims are not necessarily limited to the specific features or operations described. Rather, the specific features and operations are disclosed as preferred forms of implementing the claimed subject matter.

The invention claimed is:

1. A method at least partially implemented by a computer, the method comprising:
   directly scan converting shape geometry comprising shape and/or position attributes of one or more objects into compressed scan converted data by:
      identifying a point where a scanline intersects an object of the one or more objects; and
      encoding an indication into the compressed scan converted data to specify that a pixel corresponding to the point is transparent to facilitate application anti-aliasing operations;
   storing the compressed scan converted data into a memory, the memory not being a frame buffer; and
   wherein the scan converted data is available for moving into the frame buffer for rendering upon request by an application.

2. The method of claim 1, wherein the compressed scan converted data is run-length encoded.

3. A computer-readable storage medium comprising computer-executable instructions for generating scan converted data, the computer-executable instructions being executable by a processor and comprising instructions for performing a method as recited in claim 1.

4. A computing device for generating scan converted data, the computing device comprising a processor coupled to a memory, the memory comprising computer-executable instructions, the computer-executable instructions being executable by the processor and comprising instructions for performing a method as recited in claim 1.

5. The method of claim 1, further comprising:
   determining, by an application, that the compressed scan converted data in the memory represents data of interest;
   responsive to the determining, copying the compressed scan converted data to the frame buffer; and
   rendering, by the application, the compressed scan converted data from the frame buffer.

6. The method of claim 1, wherein the encoding further comprises encoding one or more pixels associated with the shape geometry with a tag indicating that the one or more pixels are candidate(s) for anti-aliasing during rendering operations.

7. The method of claim 6, wherein the scan converted data is a font cache.

8. The method of claim 1:
   wherein the encoding, further comprises encoding one or more pixels associated with the shape geometry with a tag indicating that the one or more pixels are candidate(s) for anti-aliasing; and
   wherein the method further comprises:
      copying, by one or more applications, the scan converted data from memory into the frame buffer; and
      rendering, by the one or more applications, the scan converted data using anti-aliasing without performing any of the one or more applications performing any subsequent anti-aliasing analysis of the one or more pixels.

9. The method of claim 1, wherein the compressed scan converted data comprises blending information, and wherein the method further comprises:
   copying, by an application, the compressed scan converted data from the memory to the frame buffer; and
   rendering, by the application, the compressed scan converted data such that the blending information negates any need to evaluate each pixel of the compressed scan converted data to determine if the pixel should be blended with foreground and/or background colors to smooth out edged of rendered image(s).

10. A computing device for generating scan converted data, the computing device comprising:
   a processor;
   a memory coupled to the processor, the memory comprising computer-program instructions, the computer-program instructions being executable by the processor and comprising instructions for:
      accessing shape geometry, the shape geometry comprising graphical attributes of an object;
      for each of a plurality of scanlines:
         (a) scan converting a portion of the shape geometry to a compressed representation of pixel data, the portion corresponding to a scanline of the scanlines, the scan converting comprising:

identifying a point where the scanline intersects with the object; and encoding an indication into the compressed representation of pixel data to specify that a pixel corresponding to the point is transparent; and (b) directly storing the compressed representation of pixel data into a memory for subsequent application rendering, the memory not being a frame buffer.

11. The computing device of claim 10, wherein the computing device is a set-top box.

12. A The computing device as recited in of claim 10, wherein the graphical attributes comprise shape and/or position attributes.

13. The computing device of claim 10, wherein the compressed representation of pixel data is run-length encoded.

14. The computing device of claim 10, wherein the compressed representation comprises blending information, and wherein the computer-program instructions further comprise instructions for:

copying, by an application, the compressed representation from the memory to the frame buffer; and rendering, by the application, the compressed representation such that the blending information negates any need to evaluate each pixel of the compressed representation to determine if the pixel should be blended with foreground and/or background colors to smooth out edged of rendered image(s).

15. A computing device for scan converting data, the computing device comprising:

means for directly scan converting shape geometry comprising shape and/or position attributes of one or more objects into compressed scan converted data, the means for directly scanned converting comprising:

means for identifying a point where a scanline intersects an object of the one or more objects; and means for encoding an indication into the compressed scan converted data to specify that a pixel corresponding to the point is translucent to facilitate application anti-aliasing operations; and means for storing the compressed scan converted data into a non-frame buffer portion of memory for subsequent rendering.

16. A computer-readable storage medium comprising rising computer-program instructions for generating scan converted data, when executed by a processor the computer-program instructions performing operations of:

fetching shape geometry, the shape geometry comprising graphical attributes of an object;

for each of a plurality of scanlines:

stepping across a corresponding portion of the shape geometry to identify pixel data, the pixel data corresponding to one or more scanline portions, the one or more scanline portions comprising at least one of a foreground color portion or a background color portion;

representing the one or more scanline portions as compressed data by:

for encoding, during scan conversion operations, one or more pixels associated with the shape geometry with a tag indicating that the one or more pixels are candidate(s) for anti-aliasing during rendering operations; and storing the compressed data into a memory, wherein the memory is secondary memory that is not a frame buffer; and wherein the compressed data is available for subsequent copying into the frame buffer upon application request.

17. The computer-readable storage medium of claim 16, wherein the compressed data is a font cache.

18. The computer-readable storage medium of claim 16, wherein the computer-program instructions further comprise instructions for:

copying, by one or more applications, the compressed data from memory into the frame buffer; and rendering, by the one or more applications, the compressed data using anti-aliasing without performing any of the one or more applications performing any subsequent anti-aliasing analysis of the one or more pixels.

19. The computer-readable storage medium of claim 16, wherein the compressed representation is a font cache.

20. The computer-readable storage medium of claim 16, wherein the compressed scan converted data comprises blending information, and wherein the computer-program instructions for rendering further comprise instructions for:

rendering, by the one or more applications, the compressed scan converted data such that the blending information negates any need to evaluate each pixel of the compressed scan converted data to determine if the pixel should be blended with foreground and/or background colors to smooth out edged of rendered image(s).

* * * * *